March 29, 1938.  H. F. SMITH  2,112,385

FISH LURE

Filed May 4, 1936

Inventor
Harold F. Smith
by Maxwell F. Cargill
Attorney.

Patented Mar. 29, 1938

2,112,385

UNITED STATES PATENT OFFICE 2,112,385

FISH LURE

Harold F. Smith, Chicago, Ill., assignor to Trans-Lure Bait Company, Chicago, Ill., a corporation of Illinois Application May 4, 1936, Serial No. 77,795

5 Claims. (Cl. 43—41)

This invention relates to improvements in fish lures.

One object of the invention is to provide a hollow, transparent lure in which live bait can be inserted and protected from loss or injury, thereby prolonging the period of usefulness of the bait.

Another object of the invention is to provide a hollow, transparent lure having an accessible interior in which colored artificial bait inserts may be placed, whereby the color aspect of the lure can be altered at will by the user.

Another object of the invention is to provide a transparent bait-holding lure having buoyancy imparting means, such as an air chamber or pocket to render it adequately buoyant for sustaining the lure and bait, there being ports in the lure to admit the ingress to and egress of fresh water from a live bait when such is employed in the bait holding chamber.

Other objects of the invention relate to various features of construction which will be apparent from a consideration of the following specification and accompanying drawing wherein.

Figure 1:
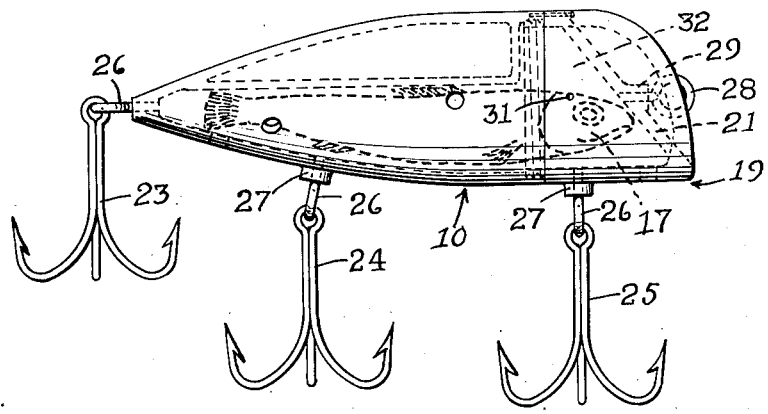
Figure 1 is a side elevation of a transparent plug-like lure embodying the present improvement.
Figure 2:
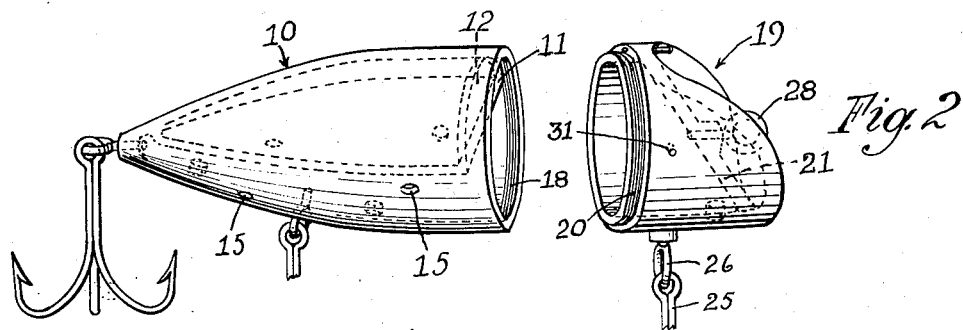
Figure 2 is a perspective view showing the forward end or head of the lure detached from the body portion.
Figures 3, 4:
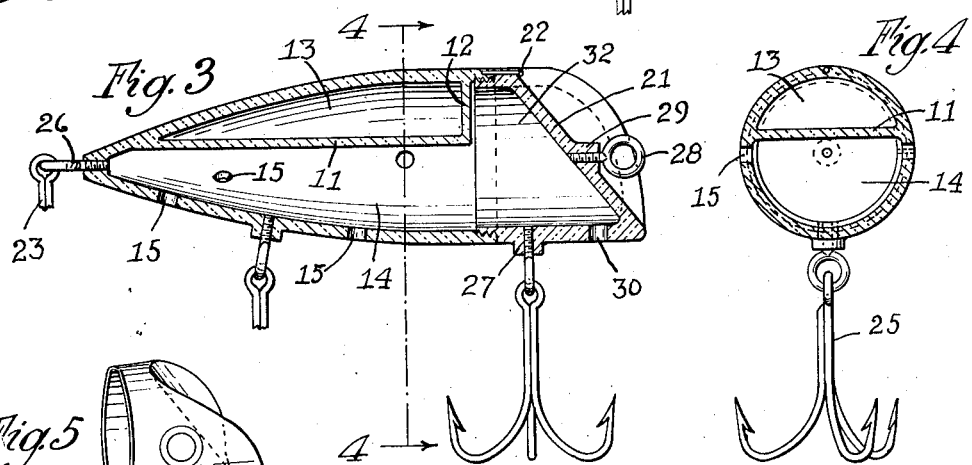
Figure 3 is a vertical longitudinal section through the lure.
Figure 4 is a transverse section taken on line 4—4 of Figure 3.
Figure 5:
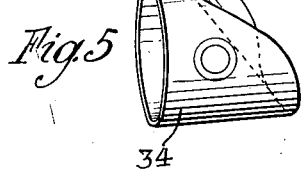
Figure 5 is a perspective view of an insert for the head of the lure.
Figure 6:
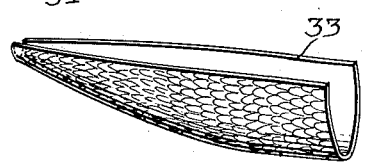
Figure 6 is a perspective of an insert for the body of the lure.

In the drawing, 10 generally designates the body of the lure which is made of a moldable transparent material such as phenol-condensation product, celluloid or other non-fragile plastic. In the form illustrated the body is circular in cross-section and as a whole the lure has the shape of well known so-called "plug" baits. However, the present lure may be changed in these respects as desired. The body 10 is provided with a longitudinal transversely disposed partition 11 and a partial vertical partition 12 which provides an hermetically sealed air chamber 13 which imparts adequate buoyancy to the lure to tend to cause it to remain at or near the surface of the water. The partitions 11 and 12 preferably are formed of the same transparent material of which the body 10 is molded.

The remaining portion of the interior of the body constitutes a bait holding compartment or chamber 14, there being preferably a number of ports 15 in the wall of the bait chamber to provide for circulation of water to a live bait within the chamber, such as a minnow 17, indicated by dotted lines in Fig. 1. Other forms of live bait may be employed in the chamber if desired, such as crawfish or hellgramites, for example, as the user may desire.

The open forward end of the body 10 is internally threaded at 18 for attachment to a closure member or head portion indicated generally by the numeral 19. The head also preferably is hollow and formed of transparent material. The interior of the head forms an extension of the bait holding chamber 14, as illustrated in Figure 1.

The rear of the head is externally threaded at 20 for detachably securing the same to the threads 18 of body 10. The forward end wall 21 of the head is illustrated as being curved in horizontal cross section and rearwardly inclined to effect submergence of the bait as it is drawn through the water.

Any suitable latch, such as a pin 22 may be provided, if desired, to prevent the accidental unscrewing and separation of the head from the body.

I have illustrated three conventional treble hooks, 23, 24 and 25, the first two secured to the body and the latter to the head. The hooks are attached to threaded eyes 26, which are retained in bosses 27 molded integral with the body and head portion to provide sufficient thickness of the material to anchor the eyes firmly in place. The rear eye 26 for hook 23 is anchored in the rear extremity of the body where the material is sufficiently thick to provide adequate anchorage without the formation of a special boss.

An eye 28 is secured in a boss 29 provided on the forward wall 21 of the head for the attachment of a fish line. The eyes 26, 28 can be retained in position against accidental loss by dipping the threaded ends in a suitable cement before screwing them into final position, although they can be removed for renewal should such become necessary.

The head 19 is provided with a port 30 at the bottom for the admission of water. To provide buoyancy to the head, I provide a small air vent 31 in a side thereof, as shown in Figs. 1 and 2, which permits the escape of air which is displaced by incoming water, but air in the head above the level of the vent 31 will be trapped, thus forming an air pocket at 32 at the top of the head when the lure is horizontal. The lure thus has buoyancy means, comprising the air pocket 32 and the chamber 13 which tends to cause the bait to float in a substantially horizontal position on the surface of the water, although it will submerge, as mentioned above, by the action of the water on the inclined forward end 21 of the head when the lure is drawn through the water.

The transparent walls of the lure enable fish to see the bait which is kept alive for substantial periods due to the flow of fresh water through the bait chamber and due to the fact that the bait is protected from injury while in the chamber.

In use, the ports permit the water to flow from the lure as it is lifted from the water which is desirable for casting purposes since otherwise the weight might in some instance be excessive. As soon as the lure strikes the surface, water freely enters the interior and the live bait is thus not deprived of water for more than a few seconds between casts.

For the purpose of adapting the lure for use as an artificial bait only, I have provided inserts 33 for the body and 34 for the head. These inserts preferably are shaped as shown to fit within the bait chamber and the interior of the head, and are suitably colored for attracting fish. Thus the insert 33 is illustrated as provided with scales which may be printed thereon.

The inserts may be made of suitable flexible sheet material, as celluloid or like non-absorptive substance and flexed, when inserted in the respective lure sections, to fit the interior walls thereof. The lures 33 and 34 are illustrated as pre-shaped to fit snugly within the bait compartment 11 and the interior of the head 19 respectively.

A fisherman may have a number of differently colored body and head inserts which he can place in the lure in such color combinations as he finds most effective.

It will be seen that the present lure, when used with live bait, protects it against attacks of small fish and against injury during casting and thus greatly prolongs its period of usefulness. The transparent material of which the lure is made renders the bait visible to game fish and protects it against loss or mutilation when a fish strikes.

While I have shown and described an embodiment of my invention for the purpose of illustration, I do not wish to be restricted specifically thereto except as so limited by the appended claims.

I claim:

1. A fish lure comprising a transparent hollow body and a detachable closure member providing access to the interior of the body, said body having a bait receiving compartment therein, and a hermetically sealed buoyancy chamber within the body above said compartment and extending parallel therewith.

2. A fish lure comprising a hollow body having a longitudinal partition therein dividing the interior of the body into an hermetically sealed upper buoyancy chamber and a lower bait holding compartment, and a detachable closure member for said body for closing said compartment.

3. An artificial bait comprising a hollow transparent body provided with transverse walls dividing the interior of the body into an upper hermetically sealed buoyancy chamber and a lower bait-holding compartment open at one end of said body, and a hollow detachable closure member for said end of said body providing, when detached, access to said bait compartment, and the interior of which communicates with said bait compartment when the closure member is attached, and constitutes an extension of said bait-holding compartment.

4. An artificial lure comprising a hollow transparent body having a transverse walls providing a hermetically sealed buoyancy chamber in the upper portion of the body and a bait-holding compartment beneath said chamber, the forward end of said body being open, a detachable hollow head for said body having an interior constituting an extension of said bait-holding compartment, and flexible artificial lures removably receivable within said bait compartment and arranged to contact the inner surface thereof.

5. An artificial lure comprising a hollow transparent body having transverse walls providing a hermetically sealed buoyancy chamber in the upper portion of the body and a bait-holding compartment beneath said chamber, the forward end of said chamber body being open, a detachable hollow transparent head for said body having an interior constituting an extension of said bait-holding compartment, and flexible artificial lures removably receivable within said bait-holding compartment and the interior of said head and arranged to contact with the respective inner surfaces thereof.

HAROLD F. SMITH.